United States Patent [19]
Buzbee et al.

[11] Patent Number: 6,052,530
[45] Date of Patent: Apr. 18, 2000

[54] DYNAMIC TRANSLATION SYSTEM AND METHOD FOR OPTIMALLY TRANSLATING COMPUTER CODE

[75] Inventors: William B. Buzbee, Half Moon Bay; James S. Mattson, Campbell; Lacky V. Shah, Sunnyvale; David A. Dunn, San Jose, all of Calif.

[73] Assignee: Hewlett-Packard Co., Palo Alto, Calif.

[21] Appl. No.: 09/030,734

[22] Filed: Feb. 25, 1998

Related U.S. Application Data

[63] Continuation-in-part of application No. 08/731,098, Oct. 9, 1996, Pat. No. 5,838,978.

[51] Int. Cl.[7] .................................................... G06F 9/445
[52] U.S. Cl. ................................................................ 395/709
[58] Field of Search ...................................... 395/709, 705

[56] References Cited

U.S. PATENT DOCUMENTS

| | | | |
|---|---|---|---|
| 4,720,778 | 1/1988 | Hall et al. ........................... | 364/DIG. 1 |
| 4,870,610 | 9/1989 | Belfer ........................................... | 704/2 |
| 5,307,504 | 4/1994 | Robinson et al. ......................... | 712/41 |
| 5,317,740 | 5/1994 | Sites ......................................... | 395/704 |
| 5,432,795 | 7/1995 | Robinson ................................. | 395/704 |
| 5,507,030 | 4/1996 | Sites ......................................... | 395/704 |
| 5,551,015 | 8/1996 | Goettelmann et al. ................. | 395/707 |
| 5,649,203 | 7/1997 | Sites ......................................... | 395/709 |
| 5,678,047 | 10/1997 | Golshani et al. ......................... | 395/705 |
| 5,732,210 | 3/1998 | Buzbee .................................... | 395/706 |
| 5,751,982 | 5/1998 | Morley .................................... | 395/385 |
| 5,764,962 | 6/1998 | Buzbee .................................... | 395/500 |
| 5,815,720 | 3/1996 | Buzbee .................................... | 395/709 |
| 5,838,978 | 10/1996 | Buzbee .................................... | 395/705 |
| 5,854,928 | 12/1998 | Buzbee .................................... | 395/705 |

OTHER PUBLICATIONS

Title: Code Generation Using Tree Matching and Dynamic Programming, Author: Aho et al, Source: ACM, Oct., 1989.
Title: Properties and Update Semantics of Consistent Views, Author: Gottlob et al, Source: ACM, Dec. 1988.
Title: Intel Reveals how Merced will be x86–compatible, Author: Alexander, Source: Electronic Engineering Times, Mar. 9, 1998.
Cmelik, et al., "Shade: A Fast Instruction–Set Simulator for Execution Profiling," 1994.
Cmelik, et al., "Shade: A Fast Instruction–Set Simulator for Execution Profiling," 1993.

*Primary Examiner*—Tariq R. Hafiz
*Assistant Examiner*—Chameli Chaudhuri Das

[57] ABSTRACT

A dynamic translation system is configured to translate existing code into translated code which is compatible with a particular computer system. As the dynamic translation system translates the existing code, the computer system executes the translated code. Once a synchronous fault occurs, the dynamic translation system retranslates the block of code containing the synchronous fault and saves the instruction and state mappings for each instruction capable of causing the synchronous fault. Once the instruction causing the synchronous fault is reached during the retranslation process, the dynamic translation system combines the saved instruction and state mappings of the instruction causing the synchronous error with the current machine state of the computer system to form a simulated machine state. This simulated machine state represents the machine state that would have existed at the time of the synchronous fault if the original code were executing, instead of the translated code. Through techniques known in the art, the computer system utilizes the simulated machine state in order to appropriately process the synchronous fault.

27 Claims, 3 Drawing Sheets

DYNAMIC TRANSLATION SYSTEM AND METHOD FOR OPTIMALLY TRANSLATING COMPUTER CODE

This document is a continuation-in-part of and claims priority to commonly assigned U.S. patent application Ser. No. 08/731,098, filed on Oct. 9, 1996, now U.S. Pat. No. 5,838,978, entitled "System and Method of Using Annotations to Optimize Dynamically Translated Code in the Presence of Signals."

FIELD OF THE INVENTION

The present invention generally relates to computer systems and, in particular, to a system and method for efficiently translating computer code into a form that is compatible with a selected computer architecture.

BACKGROUND OF THE INVENTION

Computer technology has evolved and improved at incredibly fast rates. State of the art computer architectures are rendered obsolete in a relatively short amount of time as quicker and more powerful machines are continuously designed and marketed. As a consequence of this rapid improvement in computer technology, many users experience difficulties in maintaining computer systems that are up to date with the current standards in computer technology.

One of the difficulties experienced in maintaining state of the art computers is the fact that computer code compatible with a user's current computer architecture may be incompatible with the architecture of a new computer. If the user is unable to run previously written code on a new computer architecture, then the cost of upgrading is significantly increased. As a result, translation systems have been designed which allow a user to translate original code compatible with one architecture into translated code compatible with a second architecture. After translating original code into translated code, the second architecture executes the translated code instead of the original code. Therefore, translation systems enable a user to run previously written code on different computer systems so that the user may upgrade or change his computer system without incurring the cost of losing existing code.

Translation systems can also be used to achieve other functionality. For example, translation systems can be used to translate existing code into a more efficient form so the code can be executed by the computer system more efficiently. Hence, computer code does not necessarily have to be originally incompatible with a computer system for the implementation of translation systems to be desirable.

In translating code from one form into another, attempts have been made to simply compile existing code into a new form of code capable of independently executing on the new architecture. However, this type of translation is difficult since information regarding control flow is only available at run time. Furthermore, each instruction of the existing code would have to be translated by the translation system prior to running the translated code on the new system. This could be a very time consuming process for users with large amounts of code.

Therefore, it is desirable for the translation process be dynamic in that the translation of current code occurs at run time and only the portion of the code actually used at run time is translated. Not only can a dynamic translation system make use of run time information, but a dynamic translation system may be incorporated within the architecture of a new computer so that existing code automatically runs on the new architecture making the translation process transparent to the user.

A problem experienced by dynamic translation systems is the occurrence of a synchronous fault. As known in the art, a synchronous fault occurs when an unexecutable command is detected. Synchronous faults may occur due to a variety of reasons including, but not limited to, programming errors existing in the original code or hardware changes that have occurred since the programming of the original code.

In order to appropriately process a synchronous fault, the "machine state" of the computer needs to be known. The machine state of a computer refers to the mathematical values currently stored within the computer that indicate the computer's current status. As an example, the machine state includes, but is not limited to, the values of the computer's flags, registers, and counters.

As known in the art, the execution of translated code produces a different machine state than the execution of the original code. Furthermore, when a translated instruction faults, it is important for the new architecture to know the machine state that would have been produced by a corresponding fault in the original code if the original code had been executing instead of the translated code. Therefore, it is necessary for a translation system to be capable of providing a computer with the machine state that would have been produced at the occurrence of a synchronous fault by the original code even though the translated code is actually executing.

One prior art implementation for providing the original code machine state is an inflexible correlation translation system. In this implementation, each machine state value of the original architecture is related to a particular machine state value of the new architecture. For example, a register in the original architecture is related to a particular register in the new architecture. Accordingly, the value in the particular register of the new architecture constantly reflects the value that would have existed in the original architecture if the original architecture would have been running the original code. Although this implementation is capable of keeping track of the machine state of the original code, optimal execution of the translated code does not occur because particular data must always be stored in particular locations of the new architecture.

Another prior art implementation allows a more flexible use of the data locations within the new architecture. However, in order to provide the machine state of the original code upon the occurrence of a synchronous fault, the prior art implementation keeps track of the machine state of the original code as the translated code executes. Therefore, the instruction and state mappings for each instruction capable of faulting is saved so that the machine state may be retrieved in the event of a synchronous fault. While this implementation allows free use of the new computer's registers, the additional storage requirements drastically affect the performance of the execution of the translated code.

Thus, a heretofore unaddressed need exists in the industry for a system and method for more efficiently translating original computer code into code compatible with a new architecture.

SUMMARY OF THE INVENTION

The present invention overcomes the inadequacies and deficiencies of the prior art as discussed herein. The present invention provides a dynamic translation system and method for optimally translating original computer code into translated code compatible with a particular architecture.

The present invention utilizes a computer, a translation device, and a state conversion mechanism. The translation device is preferably configured to translate a first block of instructions from a first computer program into a corresponding second block of instructions in a second computer program. The computer is designed to execute the second block of instructions and to generate an error signal and a machine state upon the occurrence of an error in executing the second block of instructions. Upon detection of the error signal, the translation device is designed to retranslate the first block of instructions saving the instruction and state mappings of the first block of instructions. Upon reaching the instruction in the retranslation that caused the error in the initial translation, the translation device transmits to the state conversion mechanism the instruction and state mappings generated during the retranslation. The state conversion mechanism is designed to generate a simulated machine state based on the transmitted instruction and state mappings as well as the machine state generated by the computer.

In accordance with another feature of the present invention, the translation device is designed to store a translation mapping into a translation mapping table after translating the first block of instructions. The translation mapping contains information indicating a correspondence between the first block of instructions and the second block of instructions. After occurrence of the executing error, the translation device retrieves the translation mapping and utilizes the information therein in order to locate the first block of instructions in order to enable the translation device to retranslate the first block of instructions.

The present invention has many advantages, a few of which are delineated hereafter, as mere examples.

An advantage of the present invention is that a simulated machine state can be produced without storing each instruction and state mapping of each instruction capable of faulting during the execution of a program. Therefore, a computer executing a translated program processes less data.

Another advantage of the present invention is that software can be translated and executed quickly and efficiently, thus increasing the overall performance of a computer system.

Other features and advantages of the present invention will become apparent to one skilled in the art upon examination of the following drawings in the detailed description. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals in the figures designate corresponding parts throughout the several views.

DETAILED DESCRIPTION OF THE INVENTION

Figure 1:
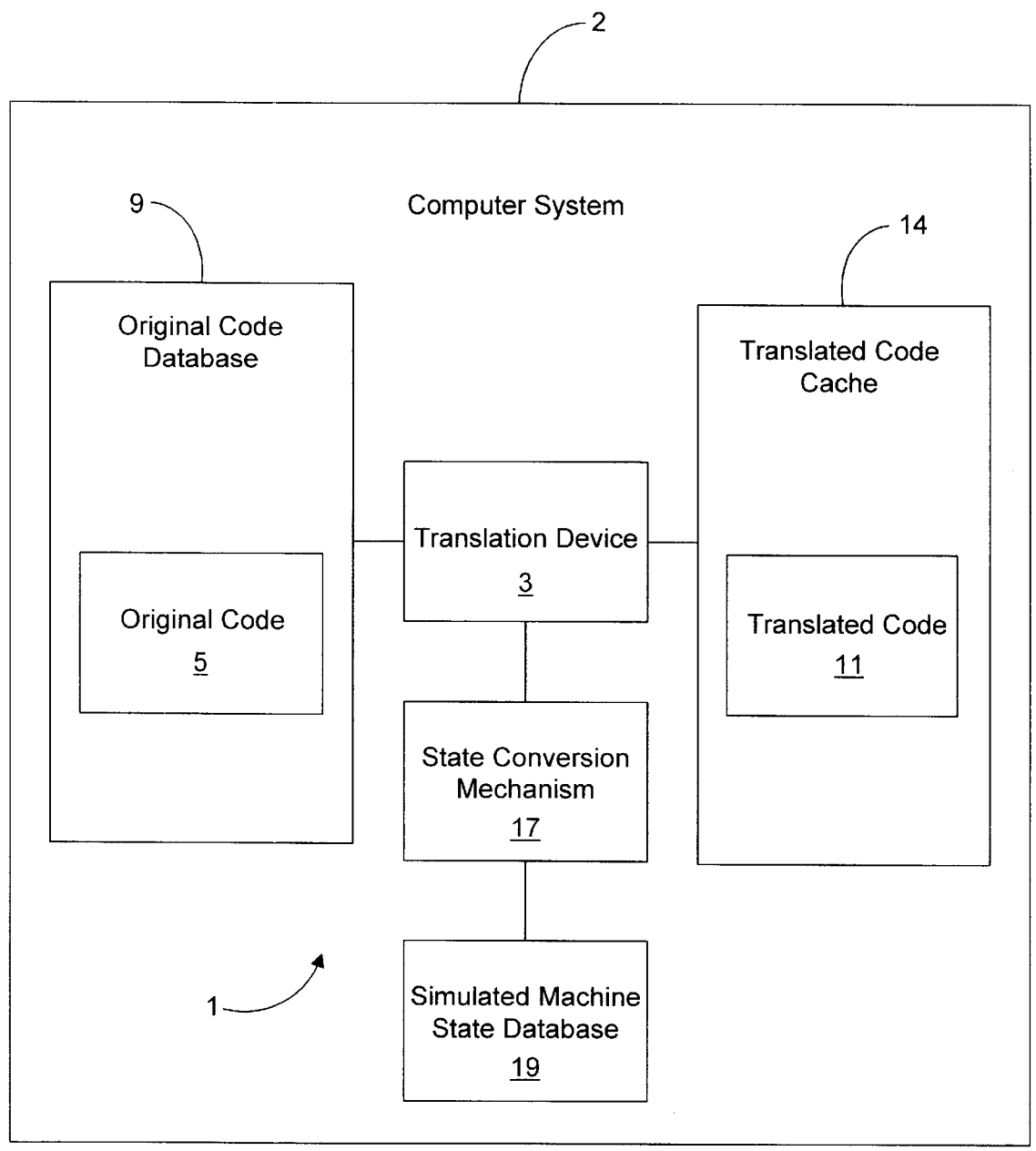
FIG. 1 is a block diagram illustrating a dynamic translation system in accordance with the prior art.

A dynamic translation system 1 in accordance with the prior art is depicted in FIG. 1. The dynamic translation system 1 is implemented within a computer system 2. In the prior art translation system 1, a translation device 3 translates original code 5 located in original code database 9 into translated code 11 located in translated code cache 14. Original code 5 is any computer program compatible with translation device 3, and translated code 11 is compatible with computer system 2. Usually, original code 5 corresponds to object code compiled from a computer program written in a high level computer language such as C or Fortran, for example. As translation device 3 translates the original code 5, the computer system 2 executes the translated code 11.

In order to properly process a synchronous fault, the computer system 2 needs to have access to the machine state that would have existed if the execution of original code 5 caused the synchronous fault rather than the execution of the translated code 11. Therefore, as translation device 3 translates the original code 5, the translation device 3 saves the instruction and state mappings of each instruction within original code 5 that is capable of trapping. The term "trap" or "trapping" refers herein to the execution of an instruction that causes a synchronous fault to occur.

When the execution of the translated code 11 results in a trap, the translation device 3 transmits the instruction mapping of the trapping instruction within original code 5 to state conversion mechanism 17. State conversion mechanism 17 combines the instruction and state mappings of the trapping instruction with the current machine state information of the computer system 2 in order to produce a simulated machine state stored in simulated machine state database 19. This simulated machine state is the machine state that would have existed at the time of the synchronous fault if the original code 5 was executing rather than the translated code 11. Accordingly, the computer system 2 uses the simulated machine state to properly process the synchronous fault.

Since it is not known which instruction will actually trap prior to the execution of the translated code 11 each instruction and state mapping of an instruction capable of trapping is saved in order to have access to the information necessary to produce a simulated machine state in the event of a synchronous fault. However, the storing of the mappings of each instruction capable of causing a synchronous fault is inefficient since only the mapping of the instruction causing the synchronous fault is needed to produce a simulated machine state.

The present invention enables optimal translation of original computer code 5 into translated code 11. The dynamic translation system of the present invention can be implemented in software, hardware, or a combination thereof. In the preferred embodiment, as illustrated by way of example in FIG. 2, the dynamic translation system of the present invention along with its associated methodology is implemented in software and stored in computer memory 21 of a computer system 23. Note that the dynamic translation system 20 can be stored on any computer-readable medium for use by or in connection with a computer-readable system or method. In the context of this document a computer-readable medium is an electronic, magnetic, optical, or other physical device or means that can contain or store a computer program for use by or in connection with a computer-related system or method. As an example, the dynamic translation system 20 may be magnetically stored and transported on a conventional portable computer diskette.

Figure 2:
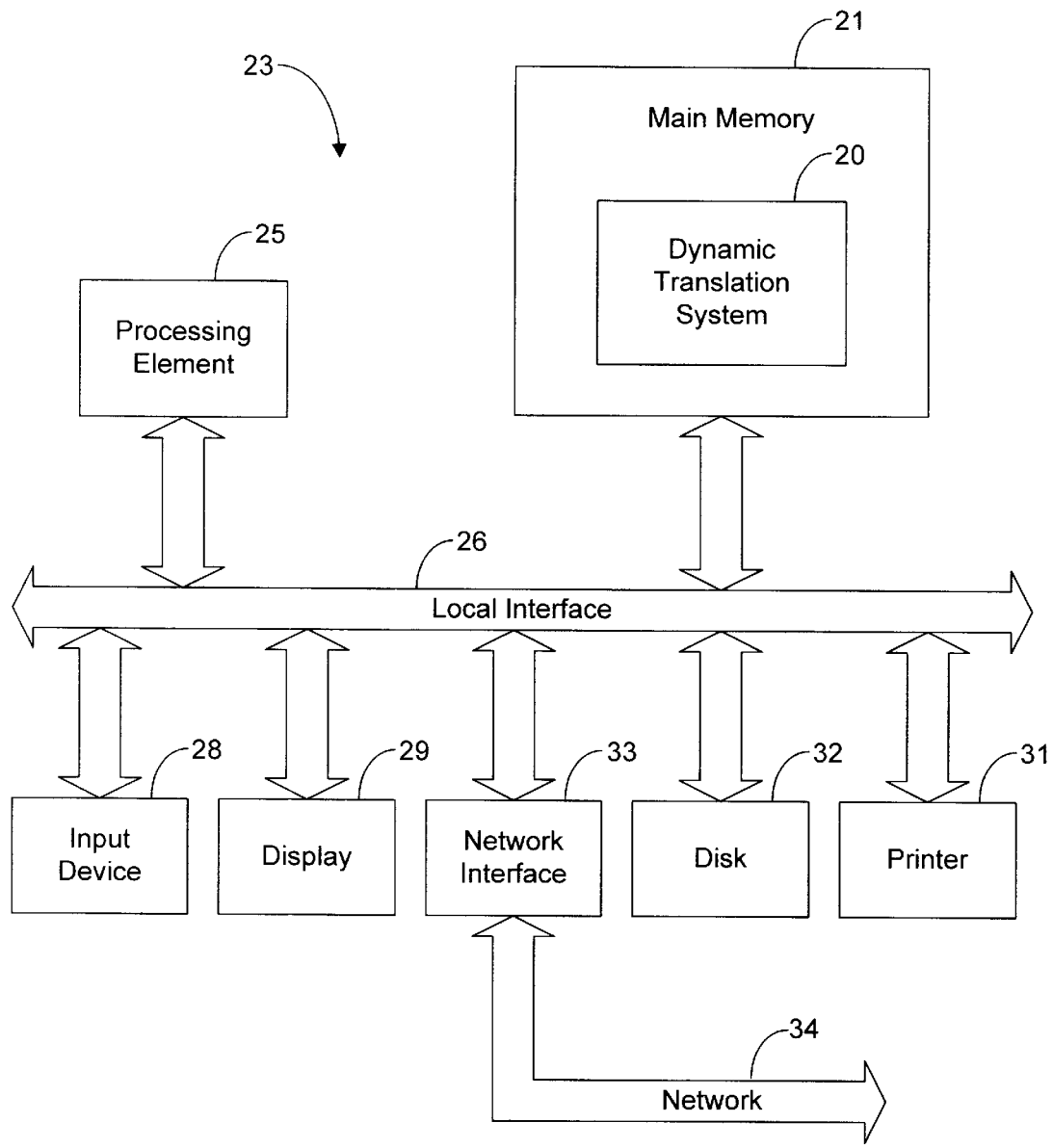
FIG. 2 is a block diagram illustrating a computer system employing the dynamic translation system of the present invention.

The preferred embodiment of the computer system 23 of FIG. 2 comprises one or more conventional processing elements 25, such as a digital signal processor (DSP), that communicate to the other elements within the system 23 via a local interface 26, which can include one or more buses. Furthermore, an input device 28, for example a keyboard or a mouse, can be used to input data from a user of the system 23, and screen display 29 or a printer 31 can be used to output data to the user. A disk storage mechanism 32 can be connected to the local interface 26 to transfer data to and from a nonvolatile disk (e.g., magnetic optical, etc.). The system 23 can be connected to a network interface 33 that allows the system 23 to exchange data with a network 34.

Figure 3:
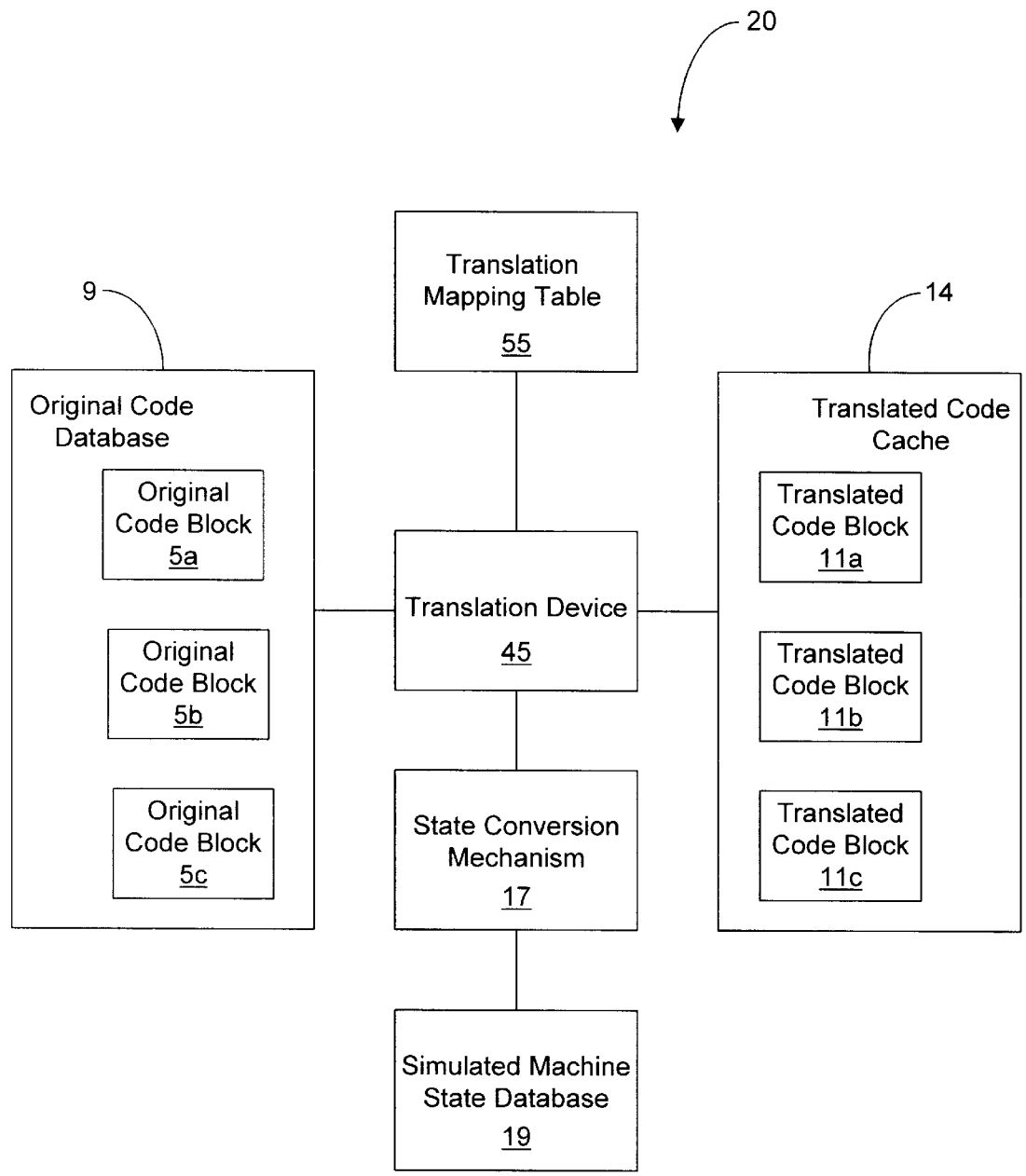
FIG. 3 is a block diagram illustrating the dynamic translation system of FIG. 2.

FIG. 3 depicts the dynamic translation system 20 of the present invention. Original code 5 is code from an existing computer program and is stored within original code data base 9 of computer system 23 (FIG. 2). It is desirable to translate original code 5 into translated code 11 which is compatible with computer system 23 (FIG. 2). Original code 5 consists of blocks of code 5a, 5b, and 5c, for example, that are designed to include portions of original code 5. Blocks of code 5a, 5b, and 5c are preferably defined so that each block of code 5a, 5b, or 5c contains a group of instructions that are executed consecutively at run time.

Translation device 45 is designed to translate original code 5 into translated code 11 which is a computer program maintained in translation code cache 14. Translated code 11 contains blocks of code 11a, 11b, and 11c which correspond to blocks of code 5a, 5b, and 5c, respectively. Each block of translated code 11 is preferably configured to contain instructions that are compatible with computer system 23 (FIG. 2) and that perform the functionality of its corresponding block of code in original code 5.

Translation device 45 is further designed to maintain a translation mapping between the blocks of code within original code 5 and the blocks of code within translated code 11. In this regard, translation device 45 is configured to store a translation mapping into translation mapping table 55 after translation of each block of original code 5. Each translation napping is configured to contain information indicating which block of code within translated code 11 corresponds to a block of code within original code 5.

Computer system 23 (FIG. 2) is initially designed to execute each block of code 11a, 11b, and 11c as each block is translated by translation device 45. While translating, computer system 23 (FIG. 2) is designed to maintain machine state information in accordance with principles established in the prior art. However, until a synchronous fault actually occurs, computer system 23 (FIG. 2) is not designed to store the instruction mappings associated with the translation of original code 5. Furthermore, computer system 23 (FIG. 2) is designed to optimize the processing of data by freely using the registers and other data locations associated with computer system 23 in any manner suitable to the processing logic being used.

When a synchronous fault is detected by computer system 23, computer system 23 is configured to generate an error signal which notifies translation device 45 of the synchronous fault. After receiving the error signal, translation device 45 is designed to use the information within translation mapping table 55 in order to discover which block of code 5a, 5b, or 5c contains the original instruction causing the trap. For example, if the trapping instruction is located in block 11a of translated code 11, then translation device 45 is configured to search mapping table 55 for the translation mapping corresponding to translated code block 11a. Using this mapping, translation device 45 is then designed to correspond original code block 5a with translated code block 11a.

After determining which block within code 5 contains the original instruction causing the synchronous fault, translation device 45 is designed to retranslate the block within code 5 causing the error (i.e., block 5a in the example hereinabove). It is not necessary for computer system 23 (FIG. 2) to execute retranslated code. While retranslating, translation device 45 is designed to save the instruction and state mappings for each instruction capable of trapping until the trapping instruction within original code 5a that caused the error during the translation process is encountered during the retranslation process. Once the trapping instruction is reached during the retranslation process, translation device 45 is designed to transmit to state conversion mechanism 17, the stored instruction and state mappings necessary to generate the simulated machine state described hereinbelow.

State conversion mechanism 17 is configured to combine the instruction and state mappings information of the trapping instruction in original code 5 with the machine state information of computer system 23 (FIG. 2) to generate a simulated machine state stored in simulated machine state database 19. This simulated machine state is designed to represent the machine state that would have existed at the time of execution of the trapping instruction if the original code 5 had been executed by a computer system rather than the translated code 11. Computer system 23 (FIG. 2) is then designed to use the simulated machine state in simulated machine state database 19 to process the synchronous fault through techniques known in the art.

OPERATION

The preferred use and operation of the dynamic translation system 20 and associated methodology are described hereafter.

The translation device 45 consecutively translates original code blocks 5a, 5b, and 5c into translated code blocks 11a, 11b, and 11c, respectively. After translation of each original code block 5, the translation device 45 enters a translation mapping into mapping table 55. This mapping indicates a correspondence between blocks 5a, 5b, and 5c and blocks 11a, 11b, and 11c, respectively. For example, since original code block 5a corresponds with translated code block 11a, a single translation mapping may contain the values of the starting address and ending address of code blocks 5a and 11a and may contain a data value or values indicating that translated code block 11a is a translation of original code block 5a.

As each block of original code 5 is translated and mapped, computer system 23 (FIG. 2) executes the corresponding block of translated code 11. For example, assume block 5a is the first block of original code 5 translated by translation device 45. After translating original code block 5a into translated code block 11a, translation device 45 maps a correspondence between code blocks 5a and 11a into mapping table 55. Then computer system 23 (FIG. 2) executes translated code block 11a. As known in the art, the machine state of computer system 23 is constantly updated while translated code block 11a is being executed. However, no attempt is initially made to store the instruction and state mappings used by translation device 45 in translating the original code 5.

If no synchronous fault occurs, then computer system 23 (FIG. 2) completes the execution of translated code block 11a, and translation device 45 then translates and maps the next original code block 11b. However, if a synchronous fault occurs during the execution ot translated code block 11a, then execution of translated code block 11a is halted.

Translation device 45 then searches mapping table 55 to determine which block of original code 5 corresponds with translated code block 11a. After determining that original code block 5a corresponds with translated code block 11a, translation device 45 retranslates original code block 5a. During this retranslation, translation device 45 saves the instruction and state mappings for each instruction that is capable of causing a synchronous fault.

Once the retranslation reaches the instruction in original code 5 that caused the fault in the initial translation of original code 5, translation device 45 transmits the instruction and state mappings of the trapping instruction within original code block 5a to state conversion mechanism 17. State conversion mechanism 17 has knowledge of the machine state of computer system 23 at the occurrence of the synchronous fault and combines the instruction mapping information transmitted from translation device 45 with the machine state of computer system 23 (FIG. 2) to produce a simulated machine state. The simulated machine state is preferably stored in simulated machine state database 19. The simulated machine state is the machine state that would have existed if the original code 5 was being executed at the time of the synchronous fault instead of translated code 45. Through techniques known in the art, computer system 23 (FIG. 2) processes the synchronous fault using the simulated machine state information within simulated machine state database 19.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A system comprising:
   a translation device configured to translate a first block of instructions from a first computer program into a second block of instructions of a second computer program, said translation device further configured to retranslate, in response to an error signal, said first block of instructions from said first computer program into a third block of instructions;
   a computer configured to execute said second computer program, to generate a machine state in executing said second computer program, and to generate said error signal when an error in executing said second computer program occurs; and
   a state conversion machine configured to generate a simulated machine state based on said machine state and based on a mapping generated by said translation device in retranslating, in response to said error signal, said first block of instructions into said third block of instructions.

2. The system of claim 1, wherein said computer is incompatible with said first computer program and is compatible with said second computer program.

3. The system of claim 1, wherein said error is a synchronous fault.

4. The system of claim 1, wherein said mapping is a mapping of an instruction in said first block of instructions, wherein said instruction in said first block of instructions is associated with said error.

5. The system of claim 4, wherein said translation device is further configured to generate another mapping of said instruction in said first block of instructions when translating said first block of instructions into said second block of instructions, said translation device further configured to discard said other mapping while translating said first block of instructions into said second block of instructions.

6. The system of claim 1, wherein said simulated machine state represents a machine state that exists upon execution of said first computer program at an occurrence of said error.

7. The system of claim 1, further comprising a translation mapping table for storing a translation mapping indicating a correspondence between said first computer program and said second computer program, said translation device configured to utilize said translation mapping to retranslate said first block of instructions into said third block of instructions.

8. The system of claim 7, wherein said translation device retrieves said translation mapping from said translation mapping table upon detection of said error signal and locates said first block of instructions based upon information within said translation mapping.

9. A dynamic translation system for translating instructions of a first block of code into instructions of a second block of code, said dynamic translation system responsive to an error signal for retranslating said instructions of said first block of code and for saving a mapping of one of said instructions of said first block of code, wherein said one of said instructions is associated with an error corresponding to said error signal.

10. The system of claim 9, wherein said translation system retranslates said instructions of said first block of code based on a translation mapping indicating a correspondence between said first block of code and said second block of code.

11. The system of claim 10, wherein said translation system stores said translation mapping into a translation mapping table before execution of said instructions of said second block of code and retrieves said translation mapping from said translation mapping table before retranslating said instructions of said first block of code.

12. The system of claim 11, wherein said translation system retrieves said instructions of said first block of code based on said translation mapping retrieved from said translation mapping table.

13. The system of claim 9, further comprising a state conversion mechanism for providing simulated machine state information based on said mapping and based on a machine state of a computer executing said second block of code.

14. The system of claim 13, wherein said simulated machine state information corresponds with a machine state that exists upon execution of said first block of code.

15. The system of claim 9, wherein said instructions of said first block of code are associated with a first computer program compatible with a first computer and said instructions of said second block of code is associated with a second computer program compatible with a second computer.

16. The system of claim 9, wherein said dynamic translation system is configured to generate instruction mappings when translating said first block of code into said instructions of said second block of code, said dynamic translation system further configured to discard each of said instruction mappings prior to receiving said error signal.

17. A method for dynamically translating instructions of a first computer program into instructions of a second computer program, comprising the steps of:
   translating instructions in a first instruction block of said first computer program into instructions in a second instruction block of said second computer program;

executing said second instruction block;

producing a machine state based on said executing step;

detecting an error in performing said executing step;

retranslating said instructions in said first instruction block in response to a detection of said error;

storing a mapping of one of said instructions of said first instruction block during said retranslating step; and generating a simulated machine state based on said instruction mapping and said machine state produced in said producing step.

18. The method of claim 17, wherein said one of said instructions is associated with said error.

19. The method of claim 18, further comprising the steps of:

storing a translation mapping indicating a correspondence between said first instruction block and said second instruction block;

retrieving said translation mapping upon said detection of said error; and utilizing said translation mapping to perform said retranslating step.

20. The method of claim 18, wherein a computer compatible with said second computer program and incompatible with said first computer program performs said executing step.

21. The method of claim 17, further comprising the steps of:

producing a plurality of instruction mappings during said translating step; and discarding each of said plurality of instruction mappings prior to said executing step.

22. A system for dynamically translating instructions of a first computer program into instructions of a second computer program, comprising:

means for translating instructions in a first instruction block of said first computer program into instructions in a second instruction block of said second computer program;

means for executing said second instruction block;

means for producing a machine state based on said executing means;

means for detecting an error associated with said executing means;

means for retranslating said instructions in said first instruction block upon a detection of said error;

means for storing a mapping of one of said instructions of said first instruction block; and means for generating a simulated machine state based on said instruction mapping and said machine state produced by said producing means.

23. The system of claim 22, wherein said one of said instructions is associated with said error.

24. The system of claim 23, further comprising a means for storing a translation mapping indicating a correspondence between said first instruction block and said second instruction block, wherein said means for retranslating further comprises:

means for retrieving said translation mapping upon said detection of said error, wherein said retranslating means utilizes said translation mapping to retranslate said instructions in said first instruction block upon said detection of said error.

25. A computer readable medium, comprising:

logic configured to translate a first block of instructions from a first computer program into a second block of instructions of a second computer program, said logic further configured to retranslate said first block of instructions into a third block of instructions upon detection of an error signal;

logic configured to execute said second computer program, to generate a machine state in executing said second computer program, and to generate said error signal when an error in executing said second computer program occurs; and logic configured to generate a simulated machine state based on said machine state and based on a mapping generated by said retranslating logic in retranslating, upon said detection, said first block of instructions into said third block of instructions.

26. The medium of claim 25, further comprising logic for storing a translation mapping indicating a correspondence between said first block of instructions and said second block of instructions, wherein said retranslating logic is further configured to utilize said translation mapping to retranslate said first block of instructions into said third block of instructions.

27. The medium ot claim 26, wherein said retranslating logic retrieves said translation mapping upon said detection of said error signal and locates said first block of instructions based upon information within said translation mapping.

* * * * *